US010616630B2

(12) United States Patent
Song et al.

(10) Patent No.: US 10,616,630 B2
(45) Date of Patent: *Apr. 7, 2020

(54) METHOD FOR QUERYING INFORMATION OF A CURRENTLY BROADCASTED TV PROGRAM AND SMART TV

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventors: Hu Song, Qingdao (CN); Shanjuan Bao, Qingdao (CN); Shiming Lu, Qingdao (CN); Yanmei Yu, Qingdao (CN)

(73) Assignees: Hisense Electric Co., Ltd., Qingdao (CN); Hisense USA Corporation, Suwanee, GA (US); Hisense International Co., Ltd., Qingdao (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/026,809

(22) Filed: Jul. 3, 2018

(65) Prior Publication Data

US 2018/0316959 A1 Nov. 1, 2018

Related U.S. Application Data

(63) Continuation of application No. 15/393,703, filed on Dec. 29, 2016, now Pat. No. 10,045,060.

(30) Foreign Application Priority Data

Oct. 20, 2016 (CN) .......................... 2016 1 0913277

(51) Int. Cl.
*G06F 3/00* (2006.01)
*G06F 13/00* (2006.01)
(Continued)

(52) U.S. Cl.
CPC . *H04N 21/26291* (2013.01); *H04N 21/23109* (2013.01); *H04N 21/2407* (2013.01);
(Continued)

(58) Field of Classification Search
CPC .. H04N 21/4334; H04N 9/8042; H04N 21/84; H04N 21/47214; H04N 21/482; H04N 5/44543
See application file for complete search history.

(56) References Cited

U.S. PATENT DOCUMENTS 6,271,893 B1 8/2001 Kawaguchi et al.
6,414,720 B1 7/2002 Tsukidate et al.
(Continued)

FOREIGN PATENT DOCUMENTS

CN 1463543 A 12/2003
CN 103618938 A 3/2014
(Continued)

OTHER PUBLICATIONS

Office Action from Chinese Application No. 201610913277.2 dated Nov. 14, 2018 (6 pages).
(Continued)

*Primary Examiner* — Jason P Salce
(74) *Attorney, Agent, or Firm* — Harness, Dickey & Pierce, P.L.C.

(57) ABSTRACT

Disclosed are a method for querying information of a TV program broadcasted currently and a smart TV, to solve the problem that the descriptive information of a TV program broadcasted currently displayed by the smart TV doesn't match the actual video image broadcasted. The method comprises: obtaining a program information list corresponding to a channel identification from an EPG server according to the channel identification of a channel broadcasted currently, where the program information list includes corre- (Continued)

spondence between program identifications and program descriptive information; after obtaining a real time video stream from a program source server corresponding to the channel identification, parsing and obtaining a program identification in the real-time video stream; and obtaining program descriptive information corresponding to the program identification from the correspondence.

10 Claims, 5 Drawing Sheets

(51) Int. Cl.
    *H04N 5/445*     (2011.01)
    *H04N 21/262*     (2011.01)
    *H04N 21/231*     (2011.01)
    *H04N 21/44*     (2011.01)
    *H04N 21/24*     (2011.01)
    *H04N 21/266*     (2011.01)
    *H04N 21/84*     (2011.01)
    *H04N 21/61*     (2011.01)

(52) U.S. Cl.
    CPC ..... *H04N 21/266* (2013.01); *H04N 21/44008* (2013.01); *H04N 21/84* (2013.01); *H04N 21/6125* (2013.01)

(56) References Cited

U.S. PATENT DOCUMENTS

| | | | |
|---|---|---|---|
| 2002/0029387 A1* | 3/2002 | Nishikawa | H04N 21/26283 725/61 |
| 2002/0078448 A1* | 6/2002 | Wakahara | H04N 5/44513 725/39 |
| 2002/0144264 A1* | 10/2002 | Broadus | H04N 5/44543 725/39 |
| 2003/0023987 A1* | 1/2003 | Hiramoto | H04N 5/782 725/141 |
| 2003/0212708 A1 | 11/2003 | Potrebic et al. | |
| 2009/0293089 A1 | 11/2009 | Taylor et al. | |
| 2012/0324510 A1 | 12/2012 | Leley et al. | |
| 2013/0047174 A1 | 2/2013 | Lee et al. | |

FOREIGN PATENT DOCUMENTS

| | | |
|---|---|---|
| CN | 103905890 A | 7/2014 |
| CN | 104410902 A | 3/2015 |

OTHER PUBLICATIONS

Office Action from Chinese Application No. 201610913277.2 dated Apr. 24, 2019 (6 pages).

\* cited by examiner

METHOD FOR QUERYING INFORMATION OF A CURRENTLY BROADCASTED TV PROGRAM AND SMART TV

CROSS-REFERENCE TO RELATED APPLICATIONS

This application is a U.S. continuation of U.S. patent application Ser. No. 15/393,703 filed Dec. 29, 2016, which claims the benefit and priority of Chinese Patent Application No. 201610913277.2 filed Oct. 20, 2016. The entire disclosures of the above applications are incorporated herein by reference.

FIELD

The present disclosure relates to the field of TV technology, and particularly to a method for querying information of a currently played TV program and a smart TV.

BACKGROUND

This section provides background information related to the present disclosure which is not necessarily prior art.

Nowadays, TV program data played on a smart TV might have come from various program source servers distributed at different geographic locations. After requesting and obtaining information of programs via internet from N program source servers distributed at different geographic locations, current Electronic Program Guide (EPG) server with carousel function rearranges and groups the programs to form EPG information with uniform format, which is then issued to the smart TV. The smart TV obtains and parses the EPG information provided by the EPG server, plays a program selected manually by a user, and at the same time obtains video stream of the program in real time from a program source server at the moment.

SUMMARY

This section provides a general summary of the disclosure, and is not a comprehensive disclosure of its full scope or all of its features.

The embodiments of the disclosure provide a method for querying information of a currently broadcasted TV program and a smart TV.

Specific technical solutions according to embodiments of the disclosure is as the follow:

In a first aspect, a method for querying information of a currently broadcasted TV program is provided according to embodiments of the disclosure, the method including:

obtaining a program information list corresponding to a channel identification from an EPG server according to the channel identification of a channel broadcasted currently, where the program information list includes correspondence between program identifications and program descriptive information;

after obtaining a real time video stream from a program source server corresponding to the channel identification, parsing and obtaining a program identification in the real-time video stream; and obtaining program descriptive information corresponding to the program identification from the correspondence.

In a second aspect, a device for querying information of a currently broadcasted TV program is provided according to embodiments of the disclosure provides, the device including:

a first processing module, configured to obtain a program information list corresponding to a channel identification from an EPG server according to the channel identification of a channel broadcasted currently, where the program information list includes correspondence between program identifications and program descriptive information;

a second processing module, configured to parse and obtain a program identification in the real-time video stream after obtaining a real-time video stream from a program source server corresponding to the channel identification; and a third processing module, configured to obtain program descriptive information corresponding to the program identification from the correspondence.

In a third aspect, embodiments of the disclosure provide another device for querying information of a currently broadcasted TV program, the device including at least one processor; and a memory; where the memory stores therein instructions executable by the at least one processor, where the instructions are executed by the at least one processor to enable the at least one processor to:

obtain a program information list corresponding to a channel identification from an EPG server according to the channel identification of a channel broadcasted currently, where the program information list includes correspondence between program identifications and program descriptive information;

after obtaining a real time video stream from a program source server corresponding to the channel identification, parse and obtain a program identification in the real time video stream; and obtain program descriptive information corresponding to the program identification from the correspondence.

In a fourth aspect, a system for querying information of a TV program is provided according to embodiments of the disclosure, where the system includes an EPG server, a program source server and a smart TV, where:

the EPG server is configured to maintain a program information list, where the program information list includes correspondence between program identifications and program descriptive information;

the program source server is configured to add a program identification to an transport stream file of a channel broadcasted currently, to form a real-time video stream;

the smart TV is configured to receive a program information list of the channel broadcasted currently and the real time video stream, search the program descriptive information corresponding to the program identification in the real-time video stream in the program information list of the channel broadcasted currently, according to the program identification in the real-time video stream, and display the program descriptive information.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present application.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

In related art, a program source server provides real time video stream, but doesn't provide any descriptive information about a program broadcasted currently, and thus a smart TV can't learn any descriptive information about the program broadcasted currently from the program source server. Meanwhile, the flow that the smart TV queries descriptive information about the program broadcasted currently from an EPG server is independent from the flow that the program source server provides real time video stream. Thus, querying descriptive information about the program broadcasted currently from an EPG server depends on accuracy and stability of data in the EPG server. Moreover, a program schedule in EPG information provided by the EPG server is obtained on the basis of the total play time of a single video file, but the program source server provides the smart TV with real time video stream which is obtained by converting several files formed by slicing the single video file. The play time of the single video file after slicing is different from the total play time of the single video file, and the difference could even be great. Therefore, it might occur that the descriptive information of a TV program broadcasted currently displaying by the smart TV doesn't match the actual video image broadcasted.

To solve the problem that the descriptive information of a TV program broadcasted currently displayed by the smart TV doesn't match the actual video image broadcasted, embodiments of the disclosure provide a method for querying information of a TV program broadcasted currently, the method including: when inquiring about a program information list of TV programs from an EPG server, a smart TV carries a program identification obtained by analyzing a real time video stream received from a program source server, and searching descriptive information corresponding to the program identification in the program information list provided by the EPG server, to ensure that the descriptive information of a TV program displayed currently on the smart TV is consistent with the actual broadcasted video image.

Embodiments of the disclosure will now be described in detail with reference to the accompanying drawings.

Figure 1:
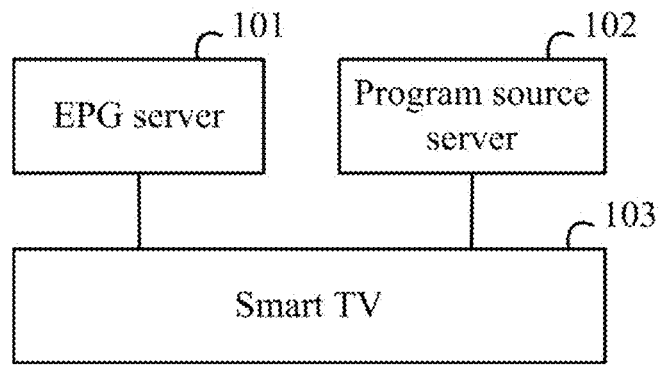
FIG. 1 is a schematic diagram of a system for querying information of a currently broadcasted TV program of a smart TV according to some embodiments of the disclosure.

According to some embodiments of the disclosure, as illustrated in FIG. 1, a system for querying information of a TV program broadcasted currently by a smart TV mainly includes an EPG server 101, a program source server 102 and a smart TV 103.

The EPG server maintains program information list with its own query update mechanism, the program information list includes correspondence between program identifications and program descriptive information. The EPG server receives a query request for program information for a designated channel, sent by the smart TV in the form of a Hyper Text Transfer Protocol (HTTP) network request, and returns to the smart TV with a program information list of the designated channel according to the query request.

The program source server provides the smart TV with a real time video stream, during slicing a whole video file in a currently broadcasted channel, the program source server adds a program identification to the Transport Stream (TS) file of each video slice to form the real-time video stream.

The smart TV sends to the EPG server the query request of program information of the designated channel in the form of an HTTP network request with installed media play software, where the designated channel is a channel broadcasted currently, and obtains the program information list of the designated channel returned by the EPG server on the basis of the query request. The smart TV obtains the real-time video stream provided by the program source server, parses the real-time video stream to obtain the program identification in the real-time video stream. The smart TV searches program descriptive information corresponding to the program identification in the real-time video stream in the program information list, obtains the program descriptive information. The smart TV obtains the program information list corresponding to the channel identification from the EPG server according to the channel identification of a currently broadcasted channel, where the program information list includes correspondence between program identifications and program descriptive information, and the smart TV receives real-time video stream files corresponding to the currently broadcasted channel from the program source server, thus the whole video file before forming the video stream file corresponds to a program identification.

Embodiments of the disclosure are especially applicable to media play software with carousel function.

Figure 2:
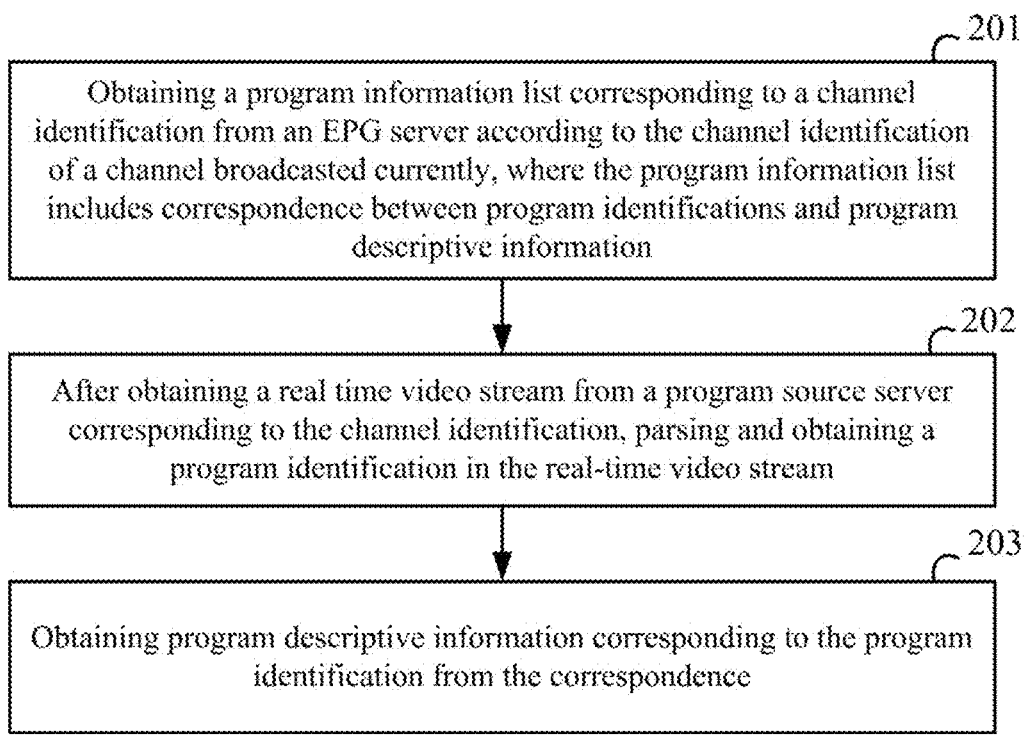
FIG. 2 is a schematic diagram of a process of querying information of a currently broadcasted TV program according to some embodiments of the disclosure.

Based on the system architecture, according to some embodiments of the disclosure, as illustrated in FIG. 2, the specific process of querying information of a TV program broadcasted currently by a smart TV with installed media play software is as follows.

Step 201: a obtaining a program information list corresponding to a channel identification from an EPG server according to the channel identification of a channel broadcasted currently, where the program information list includes correspondence between program identifications and program descriptive information.

In a specific embodiment of the disclosure, the program information list corresponding to a channel identification includes program descriptive information of each program broadcasted by the channel within 24 hours.

Program descriptive information includes at least program identification, program name, and starting and ending time of a program. Program descriptive information might also include information such as broadcast address.

In a specific embodiment of the disclosure, the smart TV sends an HTTP request to the EPG server via media play software, where the HTTP request carries channel identification of a channel selected by a user, and receives an HTTP response returned by the EPG server, where the HTTP response carries a program information list corresponding to the channel identification.

Operation 202: obtaining a real-time video stream from a program source server corresponding to the channel identification, and analyzing and obtaining a program identification in the real-time video stream.

The program identification in the real-time video stream has been added into every video slice during slicing a whole video file corresponding to the program identification by the program source server.

Specifically, the real-time video stream is obtained from the program source server corresponding to the channel identification, where the real-time video stream is obtained by slicing a whole video file corresponding to the program identification and adding the program identification into the Transport Stream (TS) file of each video slice by the program source server. That is to say, compared to the prior art, the program source server adds the program identification into each video slice during slicing the whole video file corresponding to the program identification. Then the real-time stream is parsed and the program identification is obtained from the TS files of the real-time video stream.

In a specific embodiment, the program source server slices a complete video file into successive video slices and adds the program identification of the video file into the TS file of each video slice, where each video slice with a fixed play length meets requirements of the HLS specification and is stored in the TS file format, during the slicing process, a playlist in M3U8 format is also generated, which is also called a M3U8 index file.

It should be noted that embodiments of the disclosure doesn't limit the specific form of a program identification as long as it could mark a single program uniquely. For example, the program identification could be a Program ID, or an MD5, etc. Moreover, embodiments of the disclosure don't limit a position of added program identification in a video slice, as long as the program source server agrees on an adding position of a program identification with the smart TV.

Operation 203: obtaining program descriptive information corresponding to the program identification from the correspondence.

Specifically, after obtaining the program descriptive information corresponding to the program identification from the correspondence, if it is determined that there isn't a currently broadcasted program record corresponding to the channel identification in the currently broadcasted program record list recorded locally, then a currently broadcasted program record corresponding to the program identification is added into the currently broadcasted program list, where the currently broadcasted program record corresponding to the channel identification is determined on the basis of the obtained program descriptive information.

Specifically, after obtaining the program descriptive information corresponding to the program identification from the correspondence, if it is determined that there is a currently broadcasted program record corresponding to the channel identification in the currently broadcasted program record list recorded locally, and determined that the locally recorded currently broadcasted program record corresponding to the channel identification is obtained from the program information list corresponding to the channel identification according to the program identification obtained from the real-time video stream, and determined that the locally recorded currently broadcasted program record corresponding to the channel identification is invalid, then a new currently broadcasted program record is generated according to the obtained program descriptive information, and the locally recorded currently broadcasted program record corresponding to the channel identification is replaced with the new currently broadcasted program record.

Before determining the locally recorded currently broadcasted program record corresponding to the channel identification is invalid, if it is determined the program identification in the locally recorded currently broadcasted program record corresponding to the channel identification, is different from the program identification in the obtained program descriptive information, then a video stream is obtained on the basis of a play address in the locally recorded currently broadcasted program record corresponding to the channel identification, and after retrieving a program identification from the obtained video stream, the program identification in the locally recorded currently broadcasted program record corresponding to the channel identification is replaced with the retrieved program identification.

Specifically, after obtaining the program descriptive information corresponding to the program identification from the correspondence, if it is determined that there is a currently broadcasted program record corresponding to the channel identification in a currently broadcasted program record list recorded locally, and determined the locally recorded currently broadcasted program record corresponding to the channel identification is not obtained from the program information list corresponding to the channel identification according to the program identification obtained from the real-time video stream, then a new currently broadcasted program record is generated according to the obtained program descriptive information, and the locally recorded currently broadcasted program record corresponding to the channel identification is replaced with the new currently broadcasted program record.

The specific process of a smart TV querying information of a program broadcasted currently is explained in detail with specific embodiments below.

First, the process of smart TV's media play software obtaining the video stream of a program being broadcast.

Figure 3:
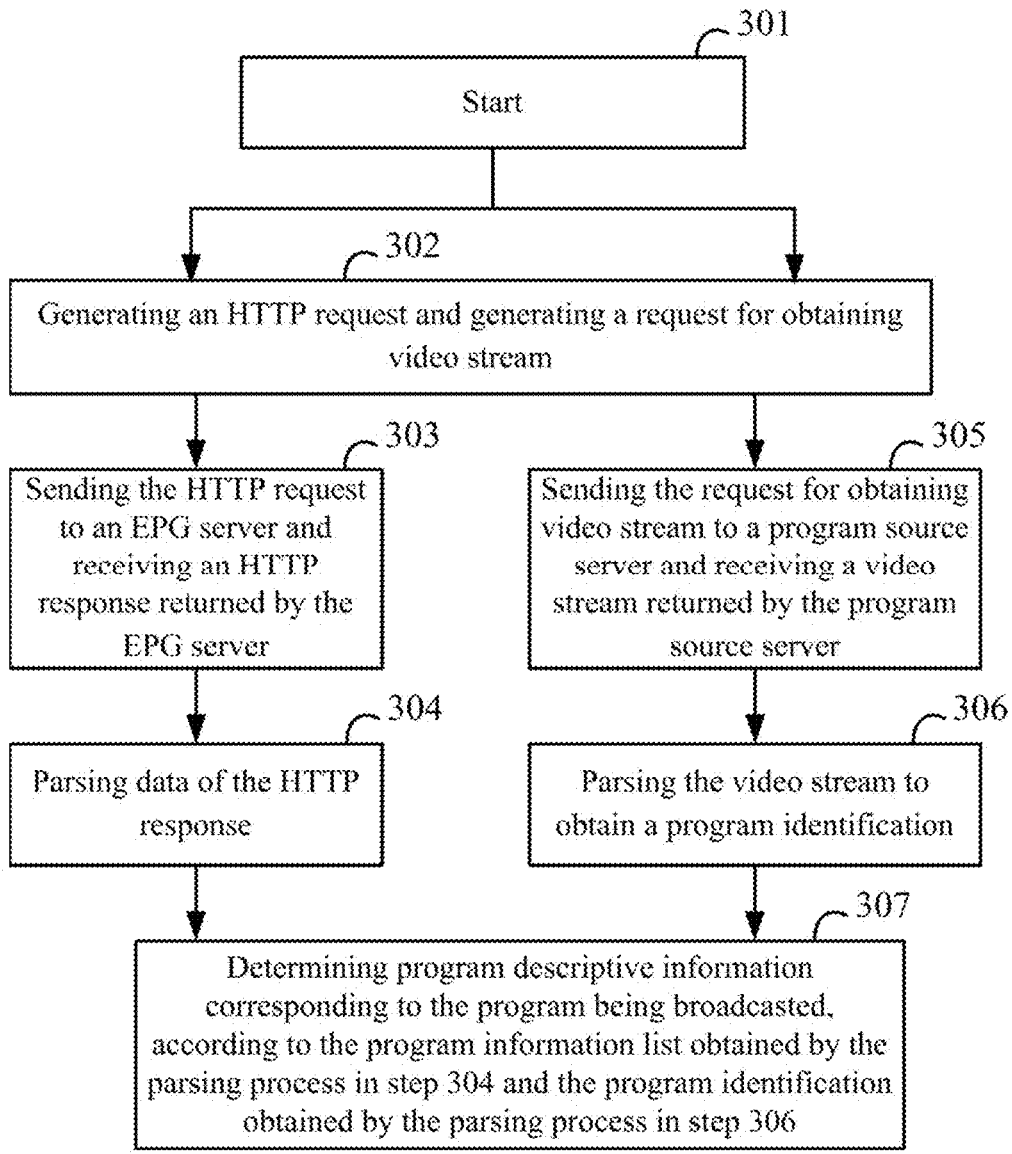
FIG. 3 is a schematic diagram of a process of obtaining the video stream of a currently broadcasted program according to some embodiments of the disclosure.

FIG. 3 is a schematic diagram of the process of a smart TV obtain the video stream of a currently broadcasted program via media play software, and the process is described in detail as follows.

Step 301: triggering a obtaining mechanism of video stream of a currently broadcast and starting the obtaining process.

Step 302: according to a specific broadcasting parameter of carousel channel, generating an HTTP request carrying a channel identification (Channel ID), and a request for obtaining the video stream carrying a play address. After generating the HTTP request, the workflow from step 303 to step 304 could be performed. After generating the request for obtaining the video stream, the workflow from step 305 to step 306 could be performed. The workflow from step 303 to step 304, and the workflow from step 305 to step 306 may be performed in parallel, and then step 307 is performed after the two workflows have been performed.

Step 303: sending the HTTP request carrying a channel identification to an EPG server, and receiving an HTTP response returned by the EPG server, where the HTTP response carries a currently broadcasted program information list corresponding to the channel identification.

Step 304: parsing data of JSON (JavaScript Object Notation) format in the HTTP response, and obtaining the currently broadcasted program information list corresponding to the channel identification.

Step 305: sending the request for obtaining the video stream carrying a play address to a program source server, and receiving the video stream returned by the program source server; in this specific embodiment, the video stream in M3U8 format is taken as an example.

Step 306: Parsing the video stream in M3U8 format to obtain a program identification marked in the video stream.

Step 307: determining the program descriptive information (Program Info) corresponding to the program being broadcasted, according to the program information list obtained in step 304 and the program identification obtained in step 306, where the program information list including correspondence between program identifications and program descriptive information.

Second, the updating process of a program being broadcasted.

Figure 4:
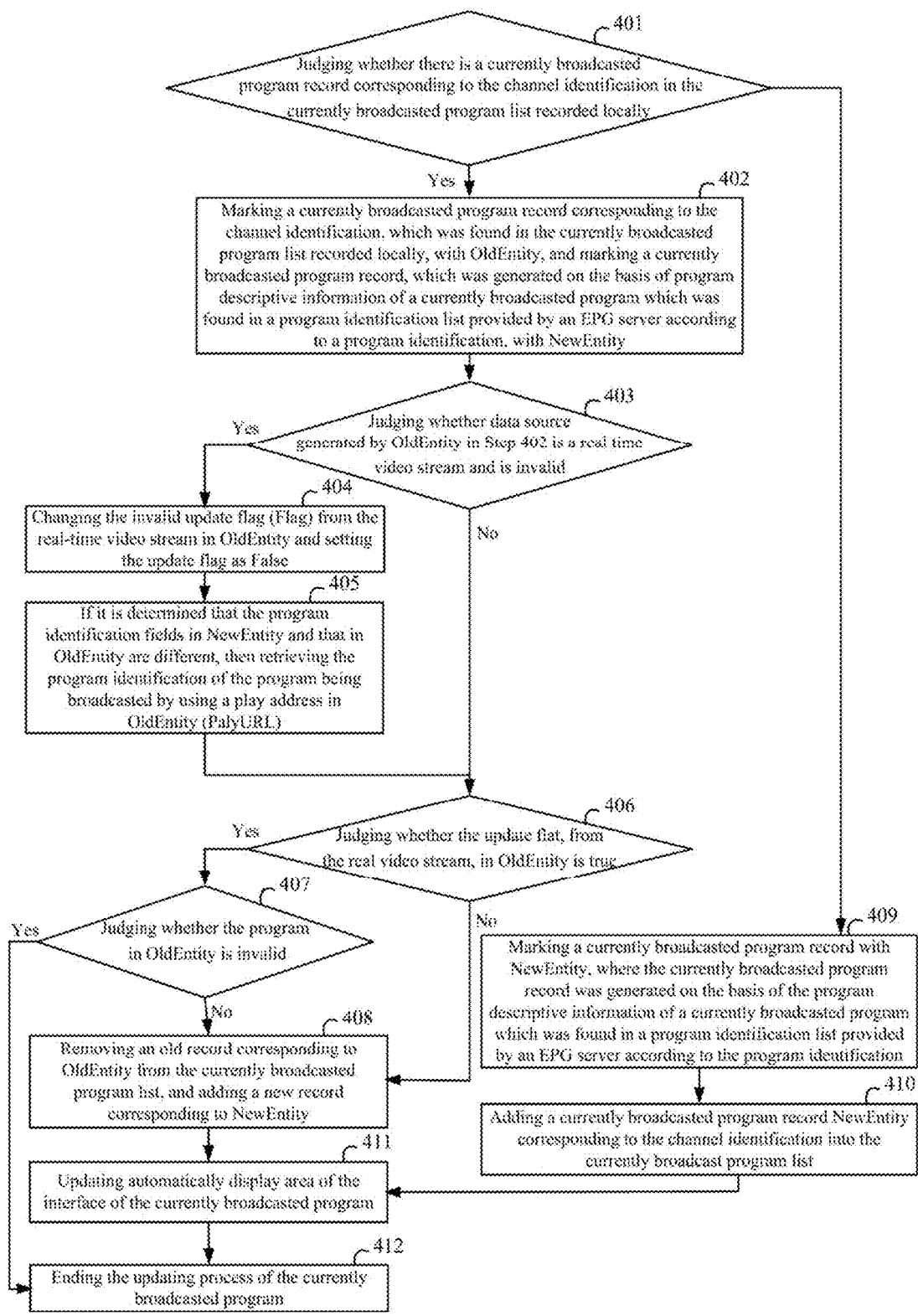
FIG. 4 is a schematic flow chart of updating a currently broadcasted program according to some embodiments of the disclosure.

FIG. 4 is a schematic diagram of an update process of a program being broadcasted, and the update process is described specifically as follows.

Step 401: going through a currently broadcasted program list recorded locally according to a channel identification, judging whether there is a currently broadcasted program record corresponding to the channel identification in the currently broadcasted program list recorded locally or not, and if so, performing step 402, otherwise performing step 409.

Step 402: marking a currently broadcasted program record corresponding to the channel identification, which was found in the currently broadcasted program list recorded locally, with OldEntity, and marking a currently broadcasted program record, which was generated on the basis of program descriptive information of a currently broadcasted program which was found in a program identification list provided by an EPG server according to a program identification, with NewEntity.

Step 403: judging whether data source generated by OldEntity in Step 402 is a real time video stream and is invalid, and if so, performing step 404, otherwise performing 406, where if the current time point of a system falls into the valid time interval from the starting time to the ending time of the program, then the data source is valid, otherwise it is invalid.

Step 404: changing the invalid update flag (Flag) from the real-time video stream in OldEntity and setting the update flag as False.

Step 405: if it is determined that the program identification fields in NewEntity and that in OldEntity are different, then retrieving the program identification of the program being broadcasted by using a play address in OldEntity (PalyURL).

Step 406: judging whether the update flat, from the real video stream, in OldEntity is true or not; and if so, performing step 407; otherwise, performing step 408.

Step 407: judging whether the program in OldEntity is invalid or not, if so, performing step 412, otherwise, performing step 408.

Step 408: removing an old record corresponding to OldEntity from the currently broadcasted program list, and adding a new record corresponding to NewEntity, and performing step 411.

Step 409: marking a currently broadcasted program record with NewEntity, where the currently broadcasted program record was generated on the basis of the program descriptive information of a currently broadcasted program which was found in a program identification list provided by an EPG server according to the program identification.

Step 410: adding a currently broadcasted program record NewEntity corresponding to the channel identification into the currently broadcasted program list.

Step 411: updating automatically display area of the interface of the currently broadcasted program.

Step 412: ending the updating process of the currently broadcasted program.

A specific example is illustrated as follow.

Figure 5:
FIG. 5 is a schematic diagram of a display interface with an unmatched problem according to some embodiments of the disclosure.

In an actual application scene, a user pushes "OK" button (also called confirm button) on a remote control actively to export a program list interface, as illustrated in FIG. 5, where the interface could display information such as the name of a channel being watched by the user, the name of a program being broadcasted as well as its starting and ending time, etc., as the program information in selected state in FIG. 5, however a video about anti fog and haze masks is actually broadcasted on the screen, when the descriptive information of a program about false eyelashes is provided for the user via the program list.

The reason that program descriptive information of the currently broadcasted program doesn't match the actual screen when broadcasting a video stream is that: when a smart TV requests a program information list from an EPG server via an HTTP request, which would introduce the factor of network delay; and total play length of a source video file of a program are different before and after the source video file sliced, and the difference could even be great, which would cause the determination of a currently broadcasted program inaccurate, where the determination is on the basis of system current time and play time of each program in the program information list determined according to total play length of each program; abnormal condition, e.g. occasionally the video is stuck during the playback process of a program, would also introduce playback delay, especially when broadcast time of a certain program continues increasing, the mismatch caused by playback delay would be more and more obvious.

To solve the problem of mismatch, on the basis of requesting a program information list from an EPG server through an HTTP request, a program identification marked in a real time video stream is used to search the program information list, and obtain program descriptive information corresponding to the program identification, thereby obtaining a relatively accurate program descriptive information of the currently broadcasted program.

Specifically, during a program source server slicing a video file, a program identification corresponding to the video file is written into a broadcast list file of video slices where the broadcast list file describes the video slices. When a player at the bottom layer of the smart TV obtains the video slices, and parses the broadcast list file of the video slices to obtain the program identification, and searches the program information list obtained from the EPG server according to the program identification, and obtains the program descriptive information corresponding to the program identification.

Specifically, the program information list obtained from the EPG server could be realized by using the following data structure.

```
ProgramInfo = {
"programId": 541610,
"contentId": 54615,
"thirdProgramUrl": "http://cdn-ws-ali-110.video-tx.com/rendition/
    201606/1825720.flv",
"thirdProgramId": "214330132695875585",
"programName": "Ju Shopping-1.5M9.Cyber shine oxygen mask facial
cleanser compression",
  "startTime": 1471189202576,
  "endTime": 1471190437746,
  "startupUrl": {
  "1011": "abc",
  "1015": "abc"
  }
  }
```

During searching the program information list according to the program identification, program list data of 24 hours a day corresponding to the channel identification could be quickly found because the channel identification of the channel being broadcasted is known, then program descriptive information corresponding to the program identification is searched on the basis of the program list data, to obtain the program descriptive information of the program being broadcast.

Figure 6:
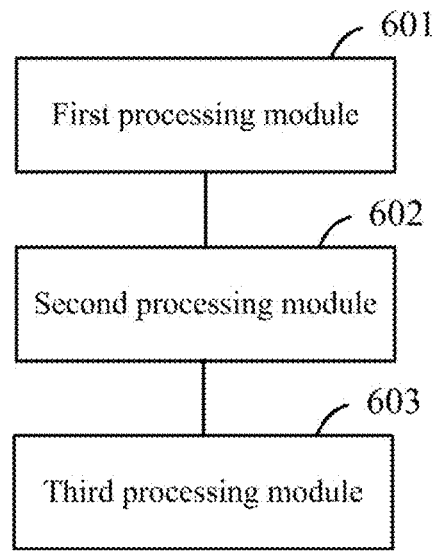
FIG. 6 is a structural schematic diagram of a device for querying information of a currently broadcasted TV program according to some embodiments of the disclosure.

Based on the same inventive concept, a device for querying information of a TV program broadcasted currently is further provided according to some embodiments of the disclosure, and specific embodiments of the device may refer to embodiments of the method, as illustrated in FIG. 6, the device mainly included:

a first processing module 601, configured to obtain a program information list corresponding to a channel identification from an EPG server according to the channel identification of a channel broadcasted currently, where the program information list includes correspondence between program identifications and program descriptive information;

a second processing module 602, configured to parse and obtain a program identification in the real-time video stream after obtaining a real-time video stream from a program source server corresponding to the channel identification; and a third processing module 603, configured to obtain program descriptive information corresponding to the program identification from the correspondence.

In a possible implementation, the second processing module is specifically configured to:

obtain the real-time video stream from the program source server corresponding to the channel identification, where the real-time video stream is obtained by slicing a whole video file corresponding to the program identification and adding the program identification into the Transport Stream (TS) file of each video slice by the program source server; and parse the real-time video stream and obtain the program identification from a TS file of the real-time video stream.

In a possible implementation, the third processing module is further configured to:

if it is determined that there isn't a currently broadcasted program record corresponding to the channel identification in the currently broadcasted program record list recorded locally, add a currently broadcasted program record corresponding to the program identification into the currently broadcasted program list, where the currently broadcasted program record corresponding to the channel identification is determined on the basis of the obtained program descriptive information.

In a possible implementation, the third processing module is further configured to:

if it is determined that there is a currently broadcasted program record corresponding to the channel identification in the currently broadcasted program record list recorded locally, and determined that the locally recorded currently broadcasted program record corresponding to the channel identification is obtained from the program information list corresponding to the channel identification according to the program identification obtained from the real-time video stream, and determined that the locally recorded currently broadcasted program record corresponding to the channel identification is invalid, generate a new currently broadcasted program record according to the obtained program descriptive information, and replace the locally recorded currently broadcasted program record corresponding to the channel identification with the new currently broadcasted program record.

In a possible implementation, the third processing module is further adapted to:

before determining the locally recorded currently broadcasted program record corresponding to the channel identification is invalid, if it is determined that the program identification in the locally recorded currently broadcasted program record corresponding to the channel identification, is different from the program identification in the obtained program descriptive information, obtain a video stream on the basis of a play address in the locally recorded currently broadcasted program record corresponding to the channel identification, and after retrieving a program identification from the obtained video stream, replace the program identification in the locally recorded currently broadcasted program record corresponding to the channel identification with the retrieved program identification.

Figure 7:
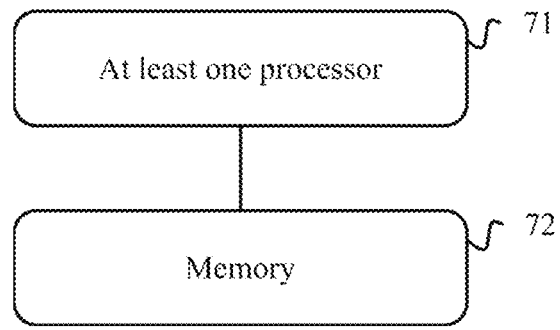
FIG. 7 is a structural schematic diagram of another device for querying information of a currently broadcasted TV program according to some embodiments of the disclosure.

Based on the same inventive concept, a device for querying information of a currently broadcasted TV program is provided according to some embodiments of the disclosure, as illustrated in FIG. 7, the device including:

at least one processor 71 and a memory 72, where the memory 72 stores therein instructions executable by the at least one processor 71, where the instructions are executed by the at least one processor 71 to enable the at least one processor 71 to:

obtain a program information list corresponding to a channel identification from an EPG server according to the channel identification of a channel broadcasted currently, where the program information list includes correspondence between program identifications and program descriptive information;

after obtaining a real time video stream from a program source server corresponding to the channel identification, parse and obtain a program identification in the real time video stream; and obtain program descriptive information corresponding to the program identification from the correspondence.

In a possible implementation, the at least one processor 71 configured to, after obtaining a real time video stream from a program source server corresponding to the channel identification, parse and obtain a program identification in the real time video stream, is specifically configured to:

obtain the real time video stream from the program source server corresponding to the channel identification, where the real-time video stream is obtained by slicing a whole video file corresponding to the program identification and adding the program identification into the Transport Stream (TS) file of each video slice by the program source server; and parse the real-time video stream and obtain the program identification from a TS file of the real-time video stream.

In a possible implementation, the at least one processor 71 is further configured to: after obtaining the program descriptive information corresponding to the program identification from the correspondence, if it is determined that there isn't a currently broadcasted program record corresponding to the channel identification in the currently broadcasted program record list recorded locally, add a currently broadcasted program record corresponding to the program identification into the currently broadcasted program list, where the currently broadcasted program record corresponding to the channel identification is determined on the basis of the obtained program descriptive information.

In a possible implementation, the at least one processor 71 is further configured to: after obtaining the program descriptive information corresponding to the program identification from the correspondence, if it is determined that there is a currently broadcasted program record corresponding to the channel identification in the currently broadcasted program record list recorded locally, and determined that the locally recorded currently broadcasted program record corresponding to the channel identification is obtained from the program information list corresponding to the channel identification according to the program identification obtained from the real-time video stream, and determined that the locally recorded currently broadcasted program record corresponding to the channel identification is invalid, generate a new currently broadcasted program record according to the obtained program descriptive information, and replace the locally recorded currently broadcasted program record corresponding to the channel identification with the new currently broadcasted program record.

In a possible implementation, the at least one processor 71 is further configured to: before determining the locally recorded currently broadcasted program record corresponding to the channel identification is invalid, if it is determined that the program identification in the locally recorded currently broadcasted program record corresponding to the channel identification, is different from the program identification in the obtained program descriptive information, obtain a video stream on the basis of a play address in the locally recorded currently broadcasted program record corresponding to the channel identification, and after retrieving a program identification from the obtained video stream, replace the program identification in the locally recorded currently broadcasted program record corresponding to the channel identification with the retrieved program identification.

Based on the same inventive concept, some embodiments of the disclosure further provide a non-transitory machine-readable storage medium which stores computer-executable instructions for performing the method for querying information of a TV program broadcasted currently described above.

Figure 8:
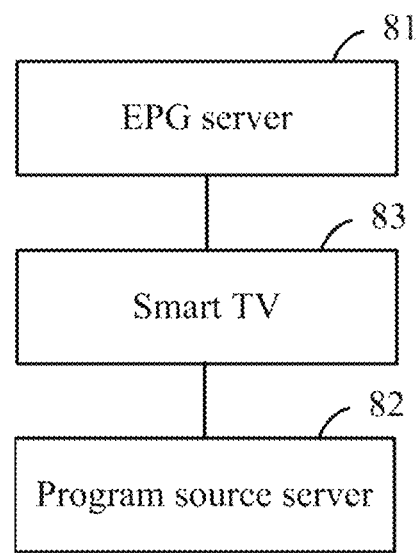
FIG. 8 is a structural schematic diagram of a system for querying information of a TV program according to some embodiments of the disclosure.

Some embodiments of the disclosure also provides a system for querying information of a TV program, as illustrated in FIG. 8, the system includes an EPG server 81, a program source server 82 and a smart TV 83, where the EPG server 81 is configured to maintain a program information list, where the program information list includes correspondence between program identifications and program descriptive information; the program source server 82 is configured to add a program identification to an transport stream file of a channel broadcasted currently, to form a real-time video stream; and the smart TV 83 is configured to receive a program information list of the channel broadcasted currently and the real-time video stream, search the program descriptive information corresponding to the the program identification in the real-time video stream in the program information list of the channel broadcasted currently, according to the program identification in the real-time video stream, and display the program descriptive information.

In a possible implementation, the smart TV 83 is further configured to: obtain the program information list corresponding to the channel identification from the EPG server 81 according to the channel identification of the channel broadcasted currently, where the program information list includes correspondence between program identifications and program descriptive information, and send a request for obtaining the real-time video stream to the program source server 82 corresponding to the channel identification. The program source server 82 is further configured to: receive the request for obtaining the real-time video stream, slice the whole video file in the channel corresponding to the channel identification, and add a program identification into transport stream file of each video slice to form a real-time video stream.

Based upon the abovementioned technical solutions, in embodiments of the disclosure, according to a program identification in a real-time video stream, program descriptive information corresponding to the program identification is obtained from a program information list corresponding to a channel identification and provided by an EPG server, thereby improving the accuracy of matching program descriptive information of a currently broadcasted TV program being displayed on a smart TV with a video image broadcasted actually, avoiding the problem that the descriptive information of the currently broadcasted TV program displayed on the smart TV is different from the video image broadcasted actually.

Those skilled in the art shall appreciate that the embodiments of the application can be embodied as a method, a system or a computer program product. Therefore the application can be embodied in the form of an all-hardware embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for processing program information of a current TV program, the method comprising:
    obtaining a program information list, wherein the program information list is obtained from an electric program guide (EPG) server and comprises correspondence between program identifications and program descriptive information;
    obtaining a video stream slice from a program source server according to a channel identification of the current TV program being played on a TV set;
    parsing the video stream slice to obtain a program identification in the video stream slice, wherein the video stream slice is formed by slicing a whole video file corresponding to the program identification into a plurality of video slices and adding the program identification into each of the video slices by the program source server;
    obtaining, based on the program information list, program descriptive information corresponding to the program identification obtained by said parsing;
    determining first program descriptive information based on the program information list and a current time on the TV set;
    in response to determining that a locally recorded, currently broadcasted program record corresponding to the channel identification is invalid, generating a new currently broadcasted program record according to the program descriptive information corresponding to the program identification obtained by said parsing, and replacing the locally recorded, currently broadcasted program record corresponding to the channel identification with the new currently broadcasted program record, where the currently broadcasted program record corresponding to the channel identification is determined based on the first program descriptive information; and
    before determining whether the locally recorded, currently broadcasted program record corresponding to the channel identification is invalid, if it is determined that the program identification in the locally recorded, currently broadcasted program record corresponding to the channel identification is different from the program identification obtained by said parsing, obtaining a video stream based on a play address in the locally recorded, currently broadcasted program record corresponding to the channel identification, and after retrieving a program identification from the obtained video stream, replacing the program identification in the locally recorded, currently broadcasted program record corresponding to the channel identification with the retrieved program identification.

2. The method according to claim 1, wherein the program information list comprises program identifications and program descriptive information during a predefined time period, and wherein each program identification corresponds to a time period.

3. The method according to claim 2, wherein the predefined time period is 1 day.

4. The method according to claim 1, further comprising:
    in response to a determination of the first program descriptive information, presenting the first program descriptive information on the TV set.

5. The method according to claim 1, wherein the video stream slice is obtained based on Internet protocol.

6. A television (TV) set comprising a display, a memory and a processor, the memory configured to have computer instructions stored thereon, and the processor, in communication with the memory, configured to execute the computer instructions to cause the TV set to:
    obtain a program information list, wherein the program information list is obtained from an electric program guide (EPG) server and comprises correspondence between program identifications and program descriptive information;
    obtain a video stream slice from a program source server according to a channel identification of a current TV program being played on the TV set;
    parse the video stream slice to obtain a program identification in the video stream slice, wherein the video stream slice is formed by slicing a whole video file corresponding to the program identification into a plurality of video slices and adding the program identification into each of the video slices by the program source server;
    obtain, based on the program information list, program descriptive information corresponding to the program identification obtained by said parsing;
    determine first program descriptive information based on the program information list and a current time on the TV set;
    in response to determining that a locally recorded, currently broadcasted program record corresponding to the channel identification is invalid, generate a new currently broadcasted program record according to the program descriptive information corresponding to the program identification obtained by said parsing, and replace the locally recorded, currently broadcasted program record corresponding to the channel identification with the new currently broadcasted program record, where the currently broadcasted program record corresponding to the channel identification is determined based on the first program descriptive information; and
    before determining whether the locally recorded, currently broadcasted program record corresponding to the channel identification is invalid, if it is determined that the program identification in the locally recorded, currently broadcasted program record corresponding to the channel identification is different from the program identification obtained by said parsing, obtain a video stream based on a play address in the locally recorded, currently broadcasted program record corresponding to the channel identification, and after retrieving a program identification from the obtained video stream, replace the program identification in the locally recorded, currently broadcasted program record corresponding to the channel identification with the retrieved program identification.

7. The TV set according to claim 6, wherein the program information list comprises program identifications and program descriptive information during a predefined time period, and wherein each program identification corresponds to a time period.

8. The TV set according to claim 7, wherein the predefined time period is 1 day.

9. The TV set according to claim 6, wherein the processor further configured to execute the computer instructions to cause the TV set to:

in response to a determination of the first program descriptive information, present the first program descriptive information on the TV set.

10. The TV set according to claim 6, wherein the video stream slice is obtained based on Internet protocol.

\* \* \* \* \*